US 8,260,380 B2

(12) United States Patent
Kim

(10) Patent No.: US 8,260,380 B2
(45) Date of Patent: Sep. 4, 2012

(54) HEADSET WITH REMOTE CONTROL

(75) Inventor: Jason Seung-Min Kim, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 662 days.

(21) Appl. No.: 11/307,355

(22) Filed: Feb. 2, 2006

(65) Prior Publication Data

US 2007/0178947 A1 Aug. 2, 2007

(51) Int. Cl.
H04M 1/00 (2006.01)
H04M 9/00 (2006.01)
H04R 25/00 (2006.01)

(52) U.S. Cl. ............. 455/575.2; 455/569.1; 455/575.6; 381/370; 381/376; 379/430

(58) Field of Classification Search .............. 455/573, 455/569.1, 575.2, 575.6; 381/370, 376; 379/430
See application file for complete search history.

(56) References Cited

U.S. PATENT DOCUMENTS

| 4,682,325 | A  | * | 7/1987  | Heys et al. ............. 370/241 |
| 5,794,163 | A  | * | 8/1998  | Paterson et al. ........ 455/575.2 |
| 6,594,366 | B1 | * | 7/2003  | Adams .................... 381/74 |
| 6,741,718 | B1 | * | 5/2004  | Brumitt et al. .......... 381/370 |
| 7,024,230 | B2 | * | 4/2006  | Curtiss et al. .......... 455/569.1 |
| 7,139,572 | B2 | * | 11/2006 | Okazaki et al. ......... 455/435.1 |
| 7,305,253 | B2 | * | 12/2007 | Snyder et al. ........... 455/557 |
| 7,406,339 | B2 | * | 7/2008  | Bazarjani et al. ....... 455/569.1 |
| 2003/0076952 | A1 | * | 4/2003  | Ma ....................... 379/430 |
| 2003/0099367 | A1 | * | 5/2003  | Okamura ................ 381/77 |
| 2003/0223612 | A1 | * | 12/2003 | Knorr et al. ............ 381/370 |
| 2004/0136522 | A1 | * | 7/2004  | Wurtz ................... 379/430 |
| 2005/0220319 | A1 | * | 10/2005 | Chan et al. ............. 381/374 |

* cited by examiner

Primary Examiner — Andrew Wendell

(57) ABSTRACT

A headset phone for use with an audio system. A conventional 4-tap, combo phone connector is provided that has a sleeve tap, a tip tap, a first ring tap, and a second ring tap. A first speaker element is connected across the sleeve and tip taps and a second speaker element is connected across the sleeve and first ring taps. A microphone is connected across the sleeve and second ring tap. At least one control unit, other than a mute control, is also connected across the sleeve and second ring taps, such that operation of any control unit changes the impedance across the sleeve and second ring tap that is seen by the audio system.

21 Claims, 2 Drawing Sheets

Audio Headphone Configuration

Cellular Phone Headset Configuration

Cellular Audio Phone Headset Configuration
With Limited Control Capability

HEADSET WITH REMOTE CONTROL

TECHNICAL FIELD

The present invention relates generally to electrical connectors, and more particularly to such wherein a plural-contact coupling part comprises a plug.

BACKGROUND ART

Many audio systems today have "phone connectors" (frequently also called "plugs") to permit connection of headphones, headsets, microphones, etc. There are currently three standard diameters: 6.35 mm (¼"), 3.5 mm (⅛"), and 2.5 mm (3/32"). There also are currently three generally accepted tap arrangements. Two-tap phone connectors (often also called "monophone plugs") can be used for mono audio devices. These are increasingly uncommon. Three-tap phone connectors (often also called "stereophone plugs") can be used for stereo devices or simpler combination devices (e.g., earplug and microphone headsets). These are presently the most commonly encountered type. Of present interest, however, standardized four tap phone connectors which are becoming increasingly important. These are also called "combo connectors" and that term is used herein. There are also various non-standard connectors, but these are often undesirable to many system designers and especially to consumers, for reasons discussed presently. When a standard connector can be specified in place of a non-standard one, most audio designers will do so.

FIG. 1 (prior art) is a schematic diagram of how a conventional three-tap phone connector can be employed in a stereo headphone application. The diameter of the phone connector used here would typically be 3.5 mm (⅛"), especially if the audio system is portable. A 6.35 mm (¼") phone connector might also be used, say, if the audio system is a stationary home or studio system, or one used in a theater or nightclub. [Connector diameter is not relevant to the present invention and its frequent mention herein is merely for completeness and to establish context with what is standard in the industry.]

FIG. 2 (prior art) is a schematic diagram of how a conventional three-tap phone connector can be employed in a cellular telephone headset application. The diameter of the phone connector used for this today is typically 2.5 mm (3/32"). That tends to frustrate sometimes consumers, who may encounter situations where an adapter is required to employ a 3.5 mm (⅛") connector in a 6.35 mm (¼") jack, and who may resent having additional devices that are incompatible without an adapter.

FIG. 3 (prior art) is a schematic diagram of how a conventional combo phone connector can be employed in a stereo headphone and microphone application (e.g., a karaoke system). There is presently no official standard for a microphone connection, but the system shown here is a straightforward extension of what is shown in FIG. 2 and is widely used.

Both of the applications in FIG. 2 and FIG. 3 include mute buttons or, more generically, a single control capability. Having any control capabilities in an external device of an audio system can be very useful, especially if these amount to more than just a mute capability. For example, in a karaoke system the user-performer would usually like to have accessible volume-up and volume-down buttons in additional to a mute, and in a more formal entertainment system it might be desirable to also have lights-up and lights-down buttons. Similarly, in a personal or wearable multi-media player it is clearly desirable to have buttons or switches for mute, volume-up, volume-down, next-selection, last-selection, etc.

Of course, such controls are typically provided at the main audio device itself, but those are often very inconvenient for users. For instance, a karaoke user-performer that is already wearing a headphone and holding a microphone should not have to walk over to a console just to reduce the volume one step. Similarly, the user of a multi-media player should not have to reach into their pocket or backpack and pull out their device just to change selections or volume.

This need for additional remote control capabilities has long been appreciated and various solutions have been attempted. One approach has been to use additional jacks on the main audio system and then use additional connectors and cables for the external devices. Having additional connectors and cables, however, is usually not desirable. The more typical approach, therefore, has been to use a non-standard connector with additional taps. Due to the number of taps needed, many such non-standard connectors use a multi-pin plug instead of the accepted cylindrical or barrel shape of the conventional phone connector. Frequently such plugs also have a "polarized" shape to prevent incorrect socket insertion.

Non-standard connectors are almost universally hated by audio system users, and are a major source of service and customer support issues for audio system manufactures. It is thus widely accepted that the use of non-standard connectors is not an adequate solution to the growing need for additional remote system control capabilities.

Accordingly, what is needed is a way to provide multiple, i.e., at least two, external control capabilities for audio systems yet also stay within the confines of current industry standards.

DISCLOSURE OF INVENTION

Accordingly, it is an object of the present invention to provide a headset, and methods for operating the same, that provide multiple control capabilities external from an audio system employing the headset.

Briefly, one preferred embodiment of the present invention is a headset phone for use with an audio system. A conventional combo phone connector is provided that has a sleeve tap, a tip tap, and first and second ring taps. A first speaker element is connected across the sleeve and tip taps, and a second speaker element is connected across the sleeve and first ring taps. A microphone element is connected across the sleeve and second ring taps. At least one control unit, other than a mute control, is also connected across the sleeve and second ring taps. Operation of any control unit then changes the impedance across the sleeve and second ring tap.

Briefly, another preferred embodiment of the present invention is a method for controlling an audio system having a jack. A conventional combo phone connector having a sleeve tap and a second ring tap is plugged into the jack, thus functionally connecting first and a second speaker elements and a microphone to the audio system. At least one user control, other than a mute control, connects across the sleeve and second ring taps. Impedance across the sleeve and second ring taps is then changed by selectively operating the user control to signal the audio system.

An advantage of the present invention is that it permits extending the use of the standard, conventional 4-tap or combo phone connector in audio systems, to provide additional remote control capability beyond the typical microphone mute capability that most systems are limited to.

Another advantage of the invention is that it provides a means to utilize a same headphone set for listening as well as for a microphone for talking or signing that includes multiple remote control functions.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE DRAWINGS

The purposes and advantages of the present invention will be apparent from the following detailed description in conjunction with the appended figures of drawings in which.

In the various figures of the drawings, like references are used to denote like or similar elements or steps.

BEST MODE FOR CARRYING OUT THE INVENTION

Figure 1:
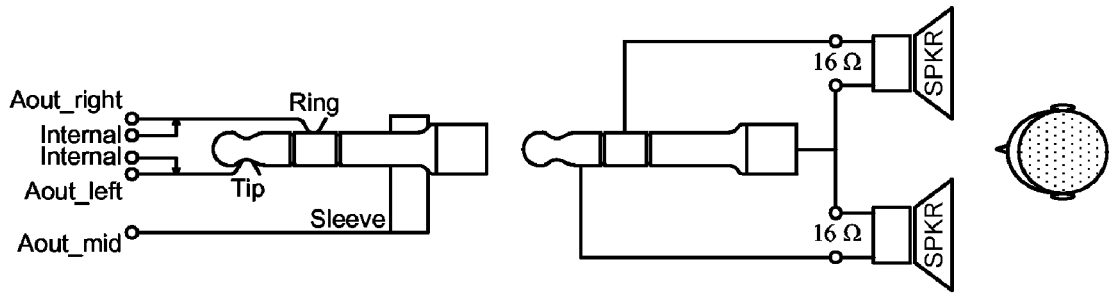
FIG. 1 (prior art) is a schematic diagram of how a conventional three-tap phone connector can be employed in a stereo headphone application.
Figure 2:
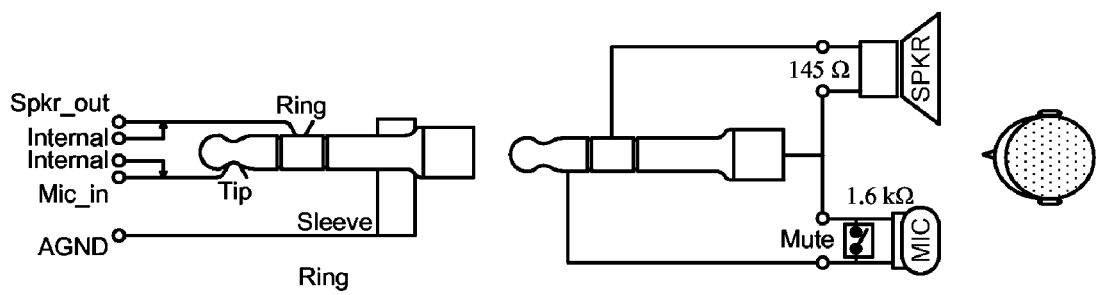
FIG. 2 (prior art) is a schematic diagram of how a conventional three-tap phone connector can be employed in a cellular telephone headset application.

A preferred embodiment of the present invention is a headset with remote control. As illustrated in the various drawings herein, and particularly in the view of FIG. 1, preferred embodiments of the invention are depicted by the general reference character 10.

Figure 4:
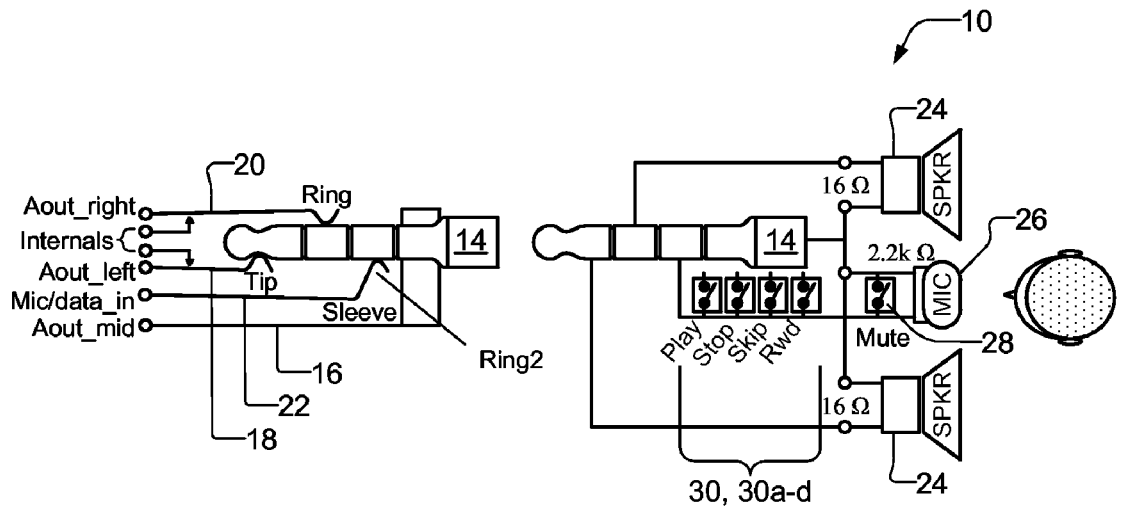
FIG. 4 is a schematic hardware diagram of a headset phone in accord with the present invention.
Figure 5:
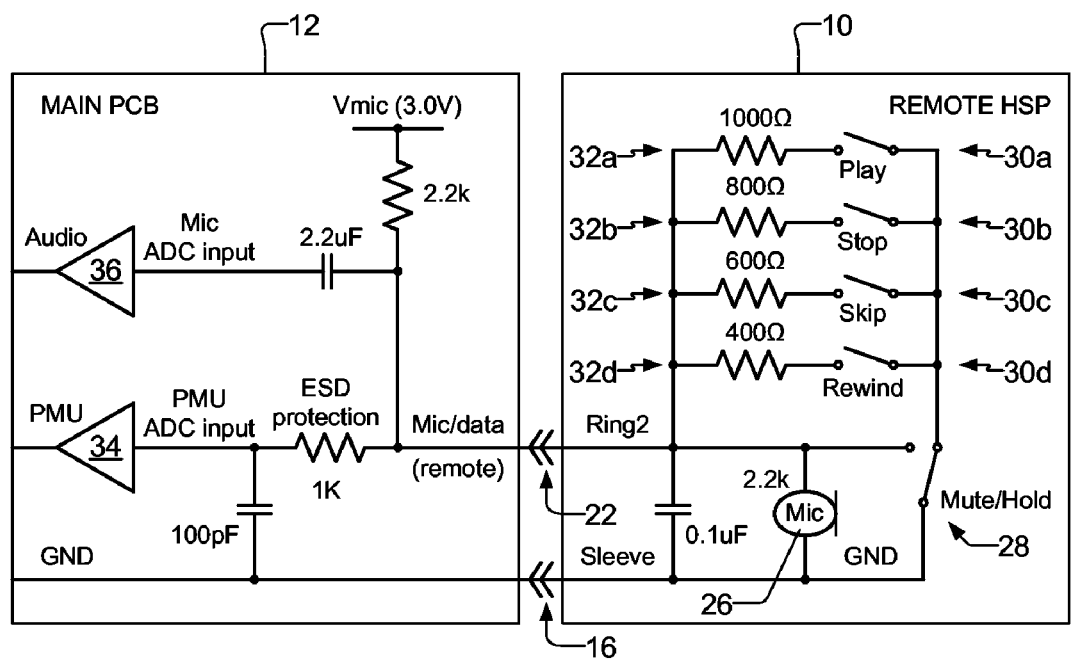
FIG. 5 is a schematic circuit diagram of relevant portions of the headset phone of FIG. 4 and of relevant portions of a printed circuit board of an audio system employing it.

FIG. 4 is a schematic hardware diagram of a headset phone (HSP 10) in accord with the present invention and FIG. 5 is a schematic circuit diagram of relevant portions of the HSP 10 and of a printed circuit board (PCB 12) of an audio system employing it.

Figure 3:
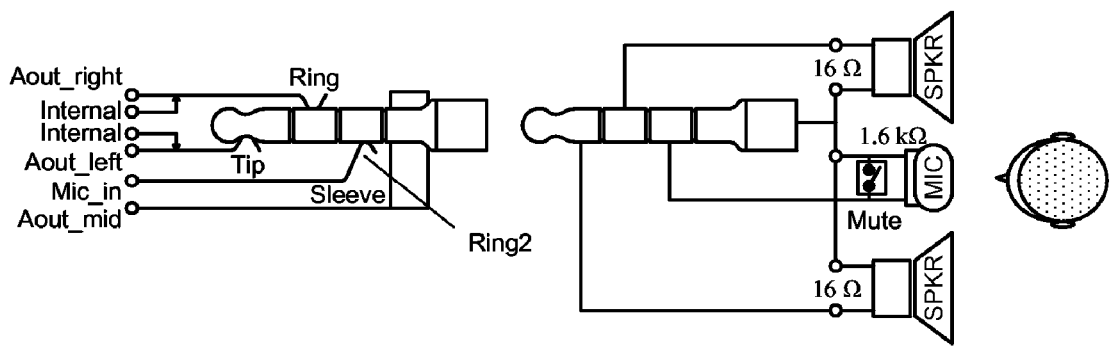
FIG. 3 (prior art) is a schematic diagram of how a conventional combo phone connector can be employed in a stereo headphone and microphone application.

Turning now to FIG. 4, from comparison with FIG. 3 it can be appreciated that the inventive HSP 10 closely conforms with the standard for combo (4-tap) phone connectors. A combo phone connector 14 is used that has a sleeve tap 16, a tip tap 18, a ring tap 20, and a ring2 tap 22. The combo phone connector 14 connects with typical audio devices, here including a pair of 16Ω speakers 24 and a 2.2 kΩ microphone 26 with a mute switch 28. The component values here are representative ones, as might be employed in multi-media player system. Of course, other component values could just as easily be used, for instance, 145Ω speakers and a 1.6 k Ω microphone (which are common values used in cell phone applications).

The HSP 10 further includes a set of additional controls 30. In FIG. 4, four switches 30a-d are stylistically shown as additional controls 30. More or less of the additional controls 30 can be provided, if desired, to perform different functions than those noted. For example, FIG. 4 depicts the additional controls serving Play, Stop, Skip, and Rewind functions, but these could instead be for Play/Pause, Menu/Select, Next/Volume+, and Previous/Volume− functions in another application. The number, control function, and type of the additional controls 30 is a matter of design preference, which will typically depend on the application the HSP 10 is intended to be used in.

FIG. 5 shows the circuitry of the HSP 10 for the microphone 26, the mute switch 28, and the additional controls 30, as well as the circuitry of the PCB 12 that works with these components. [The circuitry for the speakers 24, which can be conventional in all regards, is omitted for clarity here.] As can be seen, the sleeve tap 16 is used in the conventional role of a ground but the ring2 tap 22 now fills a dual microphone/data role.

As can be seen in FIG. 5, each of the additional controls 30 (switches 30a-d) has a resister 32a-d in series. Each of the resisters 32a-d has a different resistance value. When any of the switches 30a-d is closed its corresponding resister 32a-d is placed in parallel or shunt arrangement across the microphone 26. More specifically, at the sleeve tap 16 and the ring2 tap 22 the PCB 12 "sees" an impedance that is based on the impedance of the microphone 26 and the resistance of any resister 32a-d that has been engaged by operation of a switch 30a-d.

In most embodiments of the HSP 10 it is expected that resisters will be used, but this is not a requirement. Alternate components with reactance can be used with suitable provision in the PCB 12. Use of inductors or capacitors would, of course, mean that the frequency response of microphone input seen by the PCB 12 would change depending on engagement of the switches 30a-d. Similarly, there would be phase and amplitude shift effects. However, since the switches 30a-d used in most embodiments will be momentary contact changing types, either normally-open or normally-closed, such a change would only occur as long as a switch 30a-d was held closed. By suitable selection of components these effects can be used beneficially. For example, audible changes from this could provide user feedback confirming switch engagement. Alternately, sub-audible changes from this could be used as markers that an audio system could then later use for searches, much in the manner that some conventional micro-recorders for dictation use sub-audible tones in their recorded content as markers.

Turning now to the left-hand portion of FIG. 5, the impedance change in the HSP 10 is detected in the PCB 12 by a player management unit (PMU 34). Those skilled in the art will appreciate that various electronic sub-circuits are suitable for use as the PMU 34, and FIG. 5 merely depicts a representative case where an analog-to-digital converter (ADC) being used. In modern practice, the ADC for the PMU 34 and an audio ADC 36 for input from the microphone 26 might both be internal to a micro-processor implemented as a single integrated circuit or module handling essentially all of the main functionality of the audio system.

Continuing with FIG. 5, it can be seen that use with the PMU 34 also permits added functionality for the mute switch 28. Most audio systems that employ microphones have a main control to enable or disable microphone input, and then use a remote mute control on the microphone to permit temporarily also disabling microphone input. If the main microphone control is disabling microphone input, the mute control can potentially be used for other functionality. When the mute switch 28 is operated the PMU 34 will also see this, as an impedance that is lower than any when the microphone or any of the switches 30a-d are engaged. Accordingly, when the PMU 34 sees this and the audio system "knows" that it is not enabling microphone input, it can perceive this as another command, e.g., to Hold or Pause playback.

Many existing and emerging audio systems can employ the inventive HSP 10. For example, the HSP 10 can permit the user-performer of a karaoke system to control more functions than is possible today with any conventional single phone connector arrangement. Full stereo music could be played through the stereo speakers while mixing the reverberated vocals of the user-performer within a surround sound (SRS) virtual recording studio environment. Alternately, this could be used for noise cancellation provided by a host processor in the audio system. Public speakers often have somewhat similar needs to those in karaoke, often wanting to employ audio systems where the speakers and microphone are "on stage" with them as they speak at a podium, but where the main unit of the audio system is "off stage." Other particularly good candidates to use the HSP 10 are multi-media players, personal digital assistants, cellular telephones, and emerging devises that combine the functionalities of these. Making such audio systems small, ultra-portable, and with highly integrated multi-functional controls are all often important design goals, and the inventive HSP 10 is especially suitable to help meet these goals.

While various embodiments have been described above, it should be understood that they have been presented by way of example only, and that the breadth and scope of the invention should not be limited by any of the above described exemplary embodiments, but should instead be defined only in accordance with the following claims and their equivalents.

What is claimed is:

1. A headset phone comprising:
   a connector comprising a first tap, a second tap, and a third tap;
   a first audio output device coupled to said first tap and said second tap;
   an audio input device coupled to said first tap and said third tap, wherein said audio input device comprises a microphone; and
   a plurality of control components coupled to said first tap and operable to generate control signals for controlling an external device, wherein a control component of said plurality of control components is operable to generate a control signal by coupling a circuit component in parallel with said audio input device.

2. The headset phone of claim 1, wherein said control component comprises a switch, and wherein said circuit component comprises a resistive component.

3. The headset phone of claim 1, wherein said circuit component is operable to implement a first impedance across a first node and a second node of said audio input device responsive to an activation of said control component.

4. The headset phone of claim 1, wherein each of said plurality of control components is associated with a function selected from a group consisting of a mute function, a play function, a pause function, a stop function, a skip function, a fast forward function, a rewind function, and a volume control function.

5. The headset phone of claim 1, wherein said external device is selected from a group consisting of a portable electronic device, a home theater system, and a karaoke system.

6. The headset phone of claim 1, wherein said first audio output device comprises a speaker.

7. The headset phone of claim 1, wherein said connector further comprises a fourth tap, and further comprising:
   a second audio output device coupled to said first tap and said fourth tap.

8. An apparatus comprising:
   a connector comprising a first tap, a second tap, and a third tap;
   a first audio output device coupled to said first tap and said second tap;
   an audio input device coupled to said first tap and said third tap, wherein said audio input device comprises a microphone; and
   a plurality of control components coupled to said first tap and operable to generate control signals for controlling an external device, wherein a control component of said plurality of control components is operable to generate a control signal by coupling a circuit component in parallel with said audio input device.

9. The apparatus of claim 8, wherein said control component comprises a switch, and wherein said circuit component comprises a resistive component.

10. The apparatus of claim 8, wherein said circuit component is operable to implement a first impedance across a first node and a second node of said audio input device responsive to an activation of said control component.

11. The apparatus of claim 8, wherein each of said plurality of control components is associated with a function selected from a group consisting of a mute function, a play function, a pause function, a stop function, a skip function, a fast forward function, a rewind function, and a volume control function.

12. The apparatus of claim 8, wherein said external device is selected from a group consisting of a portable electronic device, a home theater system, and a karaoke system.

13. The apparatus of claim 8, wherein said first audio output device comprises a speaker.

14. The apparatus of claim 8, wherein said connector further comprises a fourth tap, and further comprising:
   a second audio output device coupled to said first tap and said fourth tap.

15. A system comprising:
   a connector comprising a first tap, a second tap, and a third tap;
   a first audio output device coupled to said first tap and said second tap;
   an audio input device coupled to said first tap and said third tap, wherein said audio input device comprises a microphone; and
   a plurality of control components coupled to said first tap and operable to generate control signals for controlling an external device, wherein a control component of said plurality of control components is operable to generate a control signal by coupling a circuit component in parallel with said audio input device.

16. The system of claim 15, wherein said control component comprises a switch, and wherein said circuit component comprises a resistive component.

17. The system of claim 15, wherein said circuit component is operable to implement a first impedance across a first node and a second node of said audio input device responsive to an activation of said control component.

18. The system of claim 15, wherein each of said plurality of control components is associated with a function selected from a group consisting of a mute function, a play function, a pause function, a stop function, a skip function, a fast forward function, a rewind function, and a volume control function.

19. The system of claim 15, wherein said external device is selected from a group consisting of a portable electronic device, a home theater system, and a karaoke system.

20. The system of claim 15, wherein said first audio output device comprises a speaker.

21. The system of claim 15, wherein said connector further comprises a fourth tap, and further comprising:
   a second audio output device coupled to said first tap and said fourth tap.

* * * * *